(12) United States Patent
Vanek (10) Patent No.: US 9,778,394 B2
(45) Date of Patent: Oct. 3, 2017

(54) VISUAL INTERFACE FOR IDENTIFYING LAYERS WITHIN A SUBTERRANEAN FORMATION

(71) Applicant: Halliburton Energy Services, Inc., Houston, TX (US)

(72) Inventor: Anthony Joseph Vanek, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 485 days.

(21) Appl. No.: 14/052,341

(22) Filed: Oct. 11, 2013

(65) Prior Publication Data

US 2015/0106017 A1    Apr. 16, 2015

(51) Int. Cl.
*G01V 11/00*    (2006.01)
*E21B 47/00*    (2012.01)

(52) U.S. Cl.
CPC ............ *G01V 11/002* (2013.01); *E21B 47/00* (2013.01); *G01V 11/00* (2013.01)

(58) Field of Classification Search
None
See application file for complete search history.

(56) References Cited

U.S. PATENT DOCUMENTS

| 5,835,883 | A  | * | 11/1998 | Neff      | G01V 11/00 |
|           |    |   |         |           | 702/12     |
| 6,255,819 | B1 | * | 7/2001  | Day       | G01N 24/081|
|           |    |   |         |           | 324/300    |
| 8,000,779 | B2 |   | 8/2011  | Bartnik et al. | |
| 2003/0009411 | A1 |   | 1/2003  | Ram et al. | |
| 2009/0198447 | A1 | * | 8/2009 | Legendre | G01V 1/50 |
|           |    |   |         |           | 702/11 |
| 2009/0292217 | A1 |   | 11/2009 | Bartnik et al. | |
| 2011/0120706 | A1 | * | 5/2011 | Craig | G01V 1/282 |
|           |    |   |         |           | 166/270 |

FOREIGN PATENT DOCUMENTS

WO    WO 2008031030    3/2008

* cited by examiner

*Primary Examiner* — An Do
*Assistant Examiner* — Renee I Wilson
(74) *Attorney, Agent, or Firm* — John Wusterberg; Parker Justiss, P.C.

(57) ABSTRACT

The present disclosure relates to a visual interface for identifying layers within a subterranean formation. One example method includes identifying one or more sets of data associated with a subterranean formation; computing, by operation of one or more processors, a working line based on the one or more sets of data, the working line representing a numerical average of the one or more sets of data; presenting the working line and the one or more sets of data in a common plot in a visual interface; identifying one or more layer boundaries for one or more of the layers of the subterranean formation; and generating layer data based on the one or more identified layer boundaries and the working line.

15 Claims, 7 Drawing Sheets

VISUAL INTERFACE FOR IDENTIFYING LAYERS WITHIN A SUBTERRANEAN FORMATION

BACKGROUND

The present disclosure relates to a visual interface for identifying layers within a subterranean formation.

When exploring a subterranean formation for oil and gas, it is often necessary to identify different layers or strata within the formation. Such identification may be performed by manually examining various types of data associated with the subterranean formation to determine depths at which the data indicates the different layers begin and end. Data used for this purpose may include curve data, density data, porosity data, and other types of data associated with the subterranean formation.

DESCRIPTION OF DRAWINGS

Like reference symbols in the various drawings indicate like elements.

DETAILED DESCRIPTION

The present disclosure describes concepts related to presenting one or more sets of data associated with a subterranean formation to a user and allowing the user to identify different layer (or strata) boundaries within the subterranean formation. Generally, layer boundaries are identified manually by examining one or more sets of data associated with the subterranean formation. A user will generally examine each of the sets of data independently, and determine the layer boundaries based on the data. For example, a user may identify a layer boundary by identifying a point at which the values of the data change into a different range, such as a depth where density readings reach and maintain a higher value as depth increases. However, manually comparing the different data sets associated with the subterranean formation may be time consuming and error prone, especially when a large number of data sets are being compared.

Accordingly, the present disclosure describes a visual interface that identifies one or more sets of data associated with a subterranean formation and presents the data, such as to a user. The visual interface may also calculate and present a numerical average all the identified sets of data in the form of a working line. The visual interface may then identify one or more layer boundaries. In some implementations, the visual interface receives the identifications of the boundaries from the user. The visual interface may also automatically identify the boundaries. The visual interface may generate layer data based on the one or more identified layer boundaries. The layer data may include information about each of the layers defined by the boundaries, such as, for example, the total vertical depth, measured depth, density, porosity, or rock type of the layer.

In some implementations, two or more sets of data may be superimposed on top of each other, allowing a user to easily compare the different sets of data to one another. The data may include various types of data gathered from the subterranean formation, such as, for example, curve data, permeability, porosity, density, and/or other types of data.

The techniques described herein offer several potential advantages. Allowing a user to visually compare different sets of overlaid data may enable the user to more easily and more accurately define the various layer boundaries of the subterranean formation. Further, by computing and presenting a working line representing the average of all displayed sets of data, a user may be able to more easily determine the various layer boundaries and may be better able to discard data that is not representative of the numerical average (e.g., outlier data). Graphical manipulation of the data is likewise a faster and more efficient method of data manipulation than working with a numerical grid.

Figure 1A:
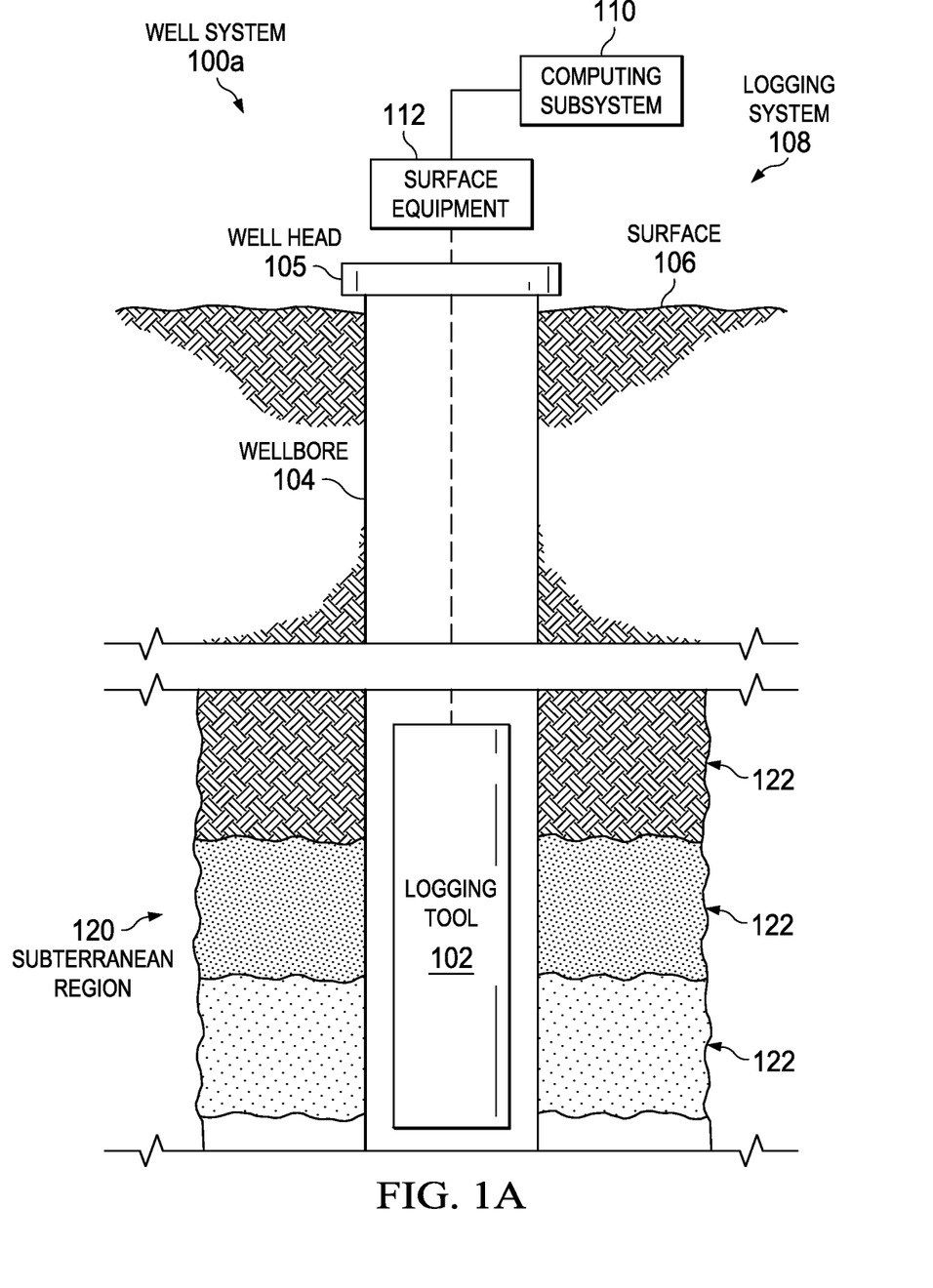
FIG. 1A is a diagram of an example well system.

FIG. 1A is a diagram of an example well system 100. The example well system 100 includes a logging system 108 and a subterranean region 120 beneath the ground surface 106. A well system can include additional or different features that are not shown in FIG. 1A. For example, the well system 100 may include additional drilling system components, wireline logging system components, etc.

The subterranean region 120 can include all or part of one or more subterranean formations or zones. The example subterranean region 120 shown in FIG. 1A includes multiple subsurface layers 122 and a wellbore 104 penetrated through the subsurface layers 122. The subsurface layers 122 can include sedimentary layers, rock layers, sand layers, or combinations of these other types of subsurface layers. One or more of the subsurface layers can contain fluids, such as brine, oil, gas, etc. Although the example wellbore 104 shown in FIG. 1A is a vertical wellbore, the logging system 108 can be implemented in other wellbore orientations. For example, the logging system 108 may be adapted for horizontal wellbores, slant wellbores, curved wellbores, vertical wellbores, or combinations of these.

The example logging system 108 includes a logging tool 102, surface equipment 112, and a computing subsystem 110. In the example shown in FIG. 1A, the logging tool 102 is a downhole logging tool that operates while disposed in the wellbore 104. The example surface equipment 112 shown in FIG. 1A operates at or above the surface 106, for example, near the well head 105, to control the logging tool 102 and possibly other downhole equipment or other components of the well system 100. The example computing subsystem 110 can receive and analyze logging data from the logging tool 102. In some implementations, the logging tool 102 can be a resistivity logging tool, gamma logging tool, acoustic logging tool, nuclear magnetic resonance (NMR) logging tool, or another type of logging tool. In some cases, data can be collected by mechanisms other than the logging tool 102, such as from a microseismic sensor array, acoustic detectors and listening equipment at the surface or in the wellbore, core samples extracted from the wellbore, or other mechanisms.

Figure 1B:
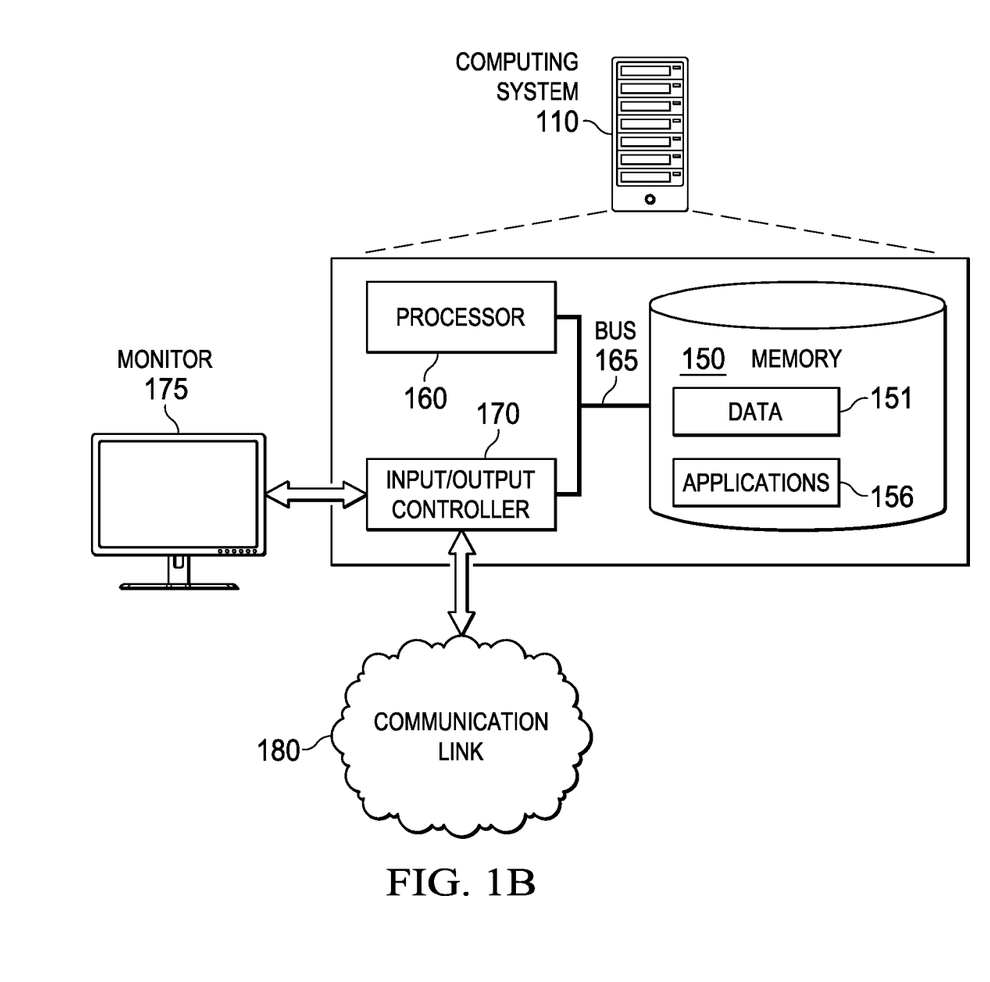
FIG. 1B is a diagram of an example computing system for implementing the techniques described herein.

FIG. 1B is a diagram of the example computing system 110 for implementing the techniques described herein. The example computing system 110 includes a processor 160, a memory 150, and input/output controllers 170 communicably coupled by a bus 165. The memory can include, for example, a random access memory (RAM), a storage device (e.g., a writable read-only memory (ROM) or others), a hard disk, or another type of storage medium. The computing system 110 can be preprogrammed or it can be programmed (and reprogrammed) by loading a program from another source (e.g., from a CD-ROM, from another computer device through a data network, or in another manner). The input/output controller 170 is coupled to input/output devices (e.g., a monitor 175, a mouse, a keyboard, or other input/output devices) and to a communication link 180. The input/output devices receive and transmit data in analog or digital form over communication links such as a serial link, a wireless link (e.g., infrared, radio frequency, or others), a parallel link, or another type of link.

The communication link 180 can include any type of communication channel, connector, data communication network, or other link. For example, the communication link 180 can include a wireless or a wired network, a Local Area Network (LAN), a Wide Area Network (WAN), a private network, a public network (such as the Internet), a WiFi network, a network that includes a satellite link, or another type of data communication network. In some implementations, data associated with a subterranean formation may be received at the computing system 110 via the communication link 180.

The memory 150 can store instructions (e.g., computer code) associated with an operating system, computer applications, and other resources. The memory 150 can also store application data and data objects that can be interpreted by one or more applications or virtual machines running on the computing system 110. As shown in FIG. 1B, the example memory 150 includes data 151 and applications 156.

In some implementations, the data 151 stored in the memory 150 may include data associated with the subterranean formation received by the computing system 110, layer data indicating layer properties identified based on the data or received from a user, and/or other data.

The applications 156 can include software applications, scripts, programs, functions, executables, or other modules that are interpreted or executed by the processor 160. Such applications may include machine-readable instructions for performing one or more of the operations represented in FIG. 5. The applications 156 may include machine-readable instructions for presenting a visual interface, as shown in and described in detail relative to FIGS. 2-6. The applications 156 can obtain input data from the memory 150, from another local source, or from one or more remote sources (e.g., via the communication link 180). The applications 156 can generate output data and store the output data in the memory 150, in another local medium, or in one or more remote devices (e.g., by sending the output data via the communication link 180).

The processor 160 can execute instructions, for example, to generate output data based on data inputs. For example, the processor 160 can run the applications 156 by executing or interpreting the software, scripts, programs, functions, executables, or other modules contained in the applications 156. The processor 160 may perform one or more of the operations represented in FIG. 6 or present the interfaces shown in FIGS. 2-5. The input data received by the processor 160 or the output data generated by the processor 160 can include any of the data 151.

Figure 2:
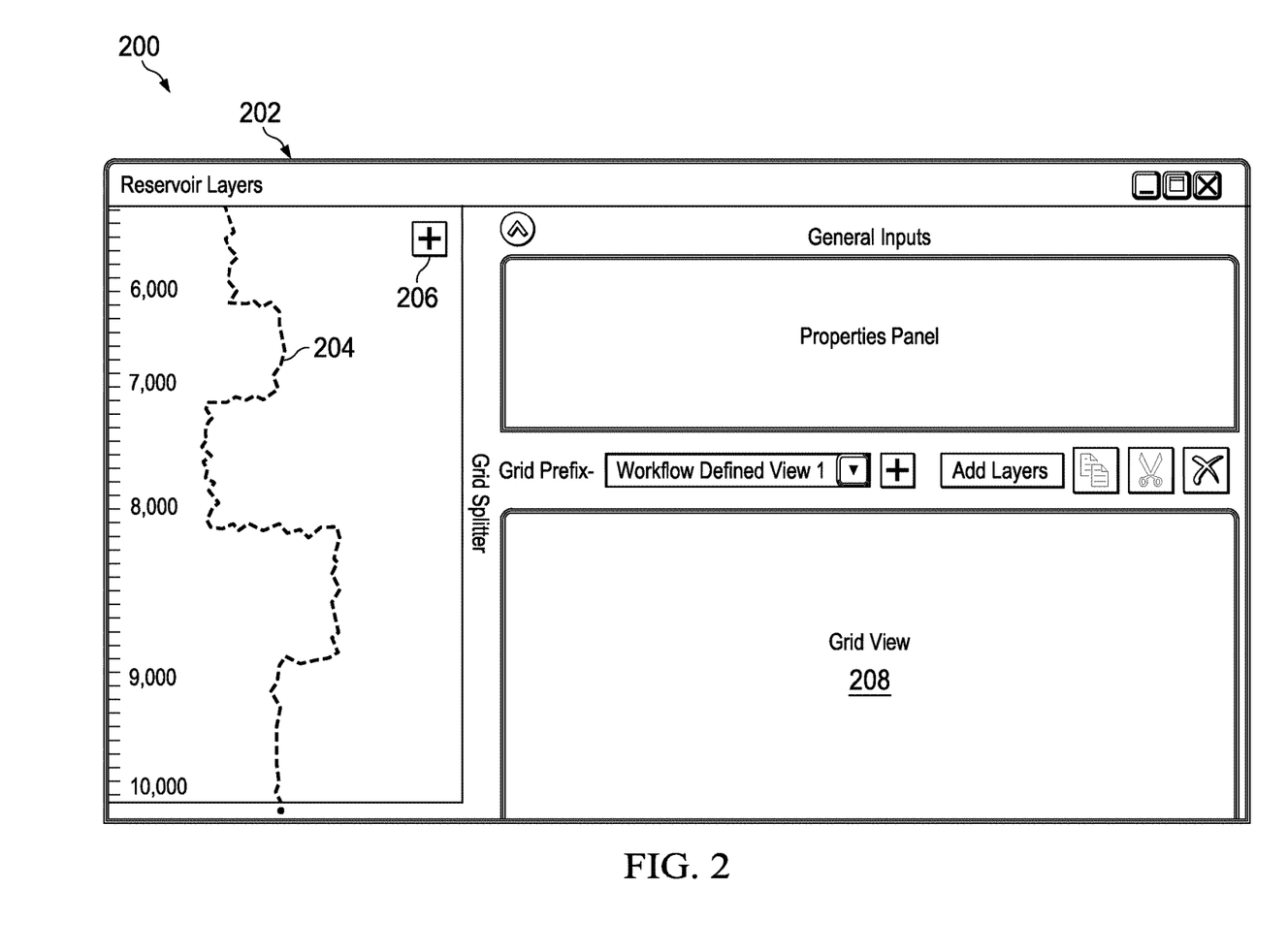
FIG. 2 is an example interface for displaying data associated with a subterranean formation.

FIG. 2 is an example interface 200 for displaying data associated with a subterranean formation. Example interface 200 includes a data pane 202. In some implementations, the data pane 202 may be operable to display data such that the depth within the subterranean formation of each data point corresponds to the vertical axis, and the specific value measured by each data point corresponds to the horizontal axis. For example, a data point representing a measurement taken at a depth of 6000 feet within the subterranean formation would appear above a data point representing a measurement taken at 8000 feet within the subterranean formation. The data pane 202 may also display data such that depth is represented on the horizontal axis, and/or may display data in other ways.

Data pane 202 includes a data line 204. In some implementations, the data line 204 represents a set of data points displayed as a connected line. The data line 204 may represent a set of data points taking the various depths within the subterranean formation. The set of data points represented by the data line 204 may represent various types of measurements associated with the subterranean formation, including, but not limited to, curve data acquired by various techniques (e.g., gamma ray logging, sonic logging, resistivity logging, etc.), density data, porosity data, pressure data, temperature data, and/or other types of data.

The data pane 202 also includes an import button 206. The import button 206 may be actuated by a user to import a new set of data points into the data pane 202. Upon importing the set of data points into the data pane 202, the set of data points may be displayed as an additional data line similar to data line 204. The example interface 200 also includes a grid pane 208, the operation of which will be described relative to FIG. 5.

Figure 3:
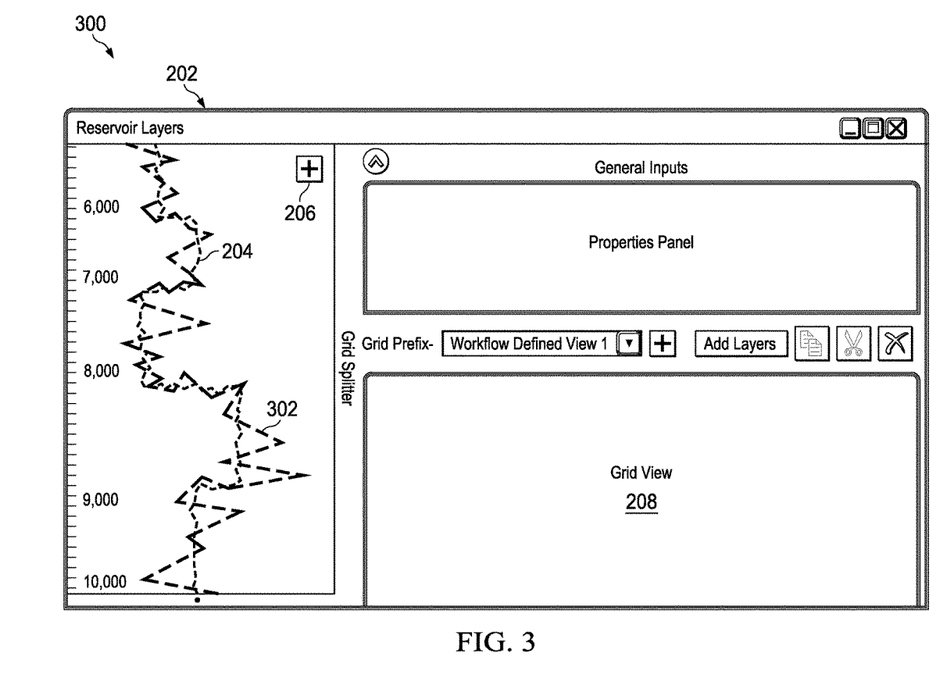
FIG. 3 is an example interface for displaying data associated with a subterranean formation showing two data lines.

FIG. 3 is an example interface 300 for displaying data associated with a subterranean formation showing an additional data line 302 superimposed over data line 204 within the data pane 206. In some implementations, the additional data line 302 represents a separate set of data points measuring the same property of the subterranean formation as the data points of data line 204. For example, the data line 204 may represent a sample of temperature data taken at various depths within the subterranean formation in a first sampling time, while the additional data line 302 may represent a sample of temperature data taken at a second, later sampling time. Overlaying the data line 204 and the additional data line 302 within the data pane 202 allows a user to more easily compare the two data lines. Although two data lines are shown in the example interface 300, the present disclosure contemplates the display of three or more data lines within the data pane 202. A single data line may also be displayed within the example interface 300.

Figure 4:
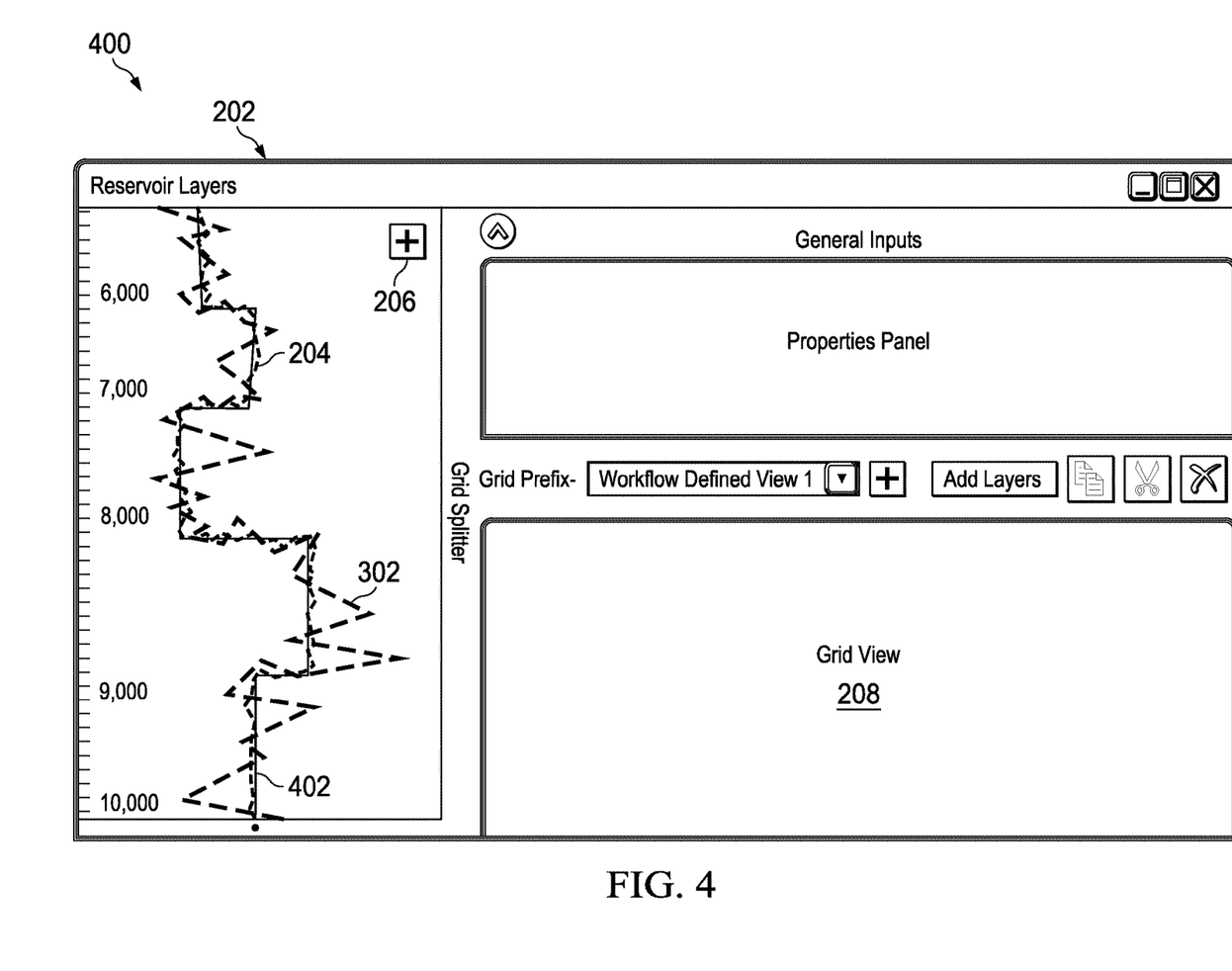
FIG. 4 is an example interface showing a working line.

FIG. 4 is an example interface 400 showing a working line 402 representing a calculated numerical average of the data line 204 and the additional data line 302. The numerical average may be automatically computed by the visual interface prior to displaying the working line 402. In some implementations, the numerical average may be calculated and the working line 402 displayed in response to the user pressing a button within the interface 400. The numerical average may also be calculated automatically and the working line 402 displayed without direction from the user.

Figure 5:
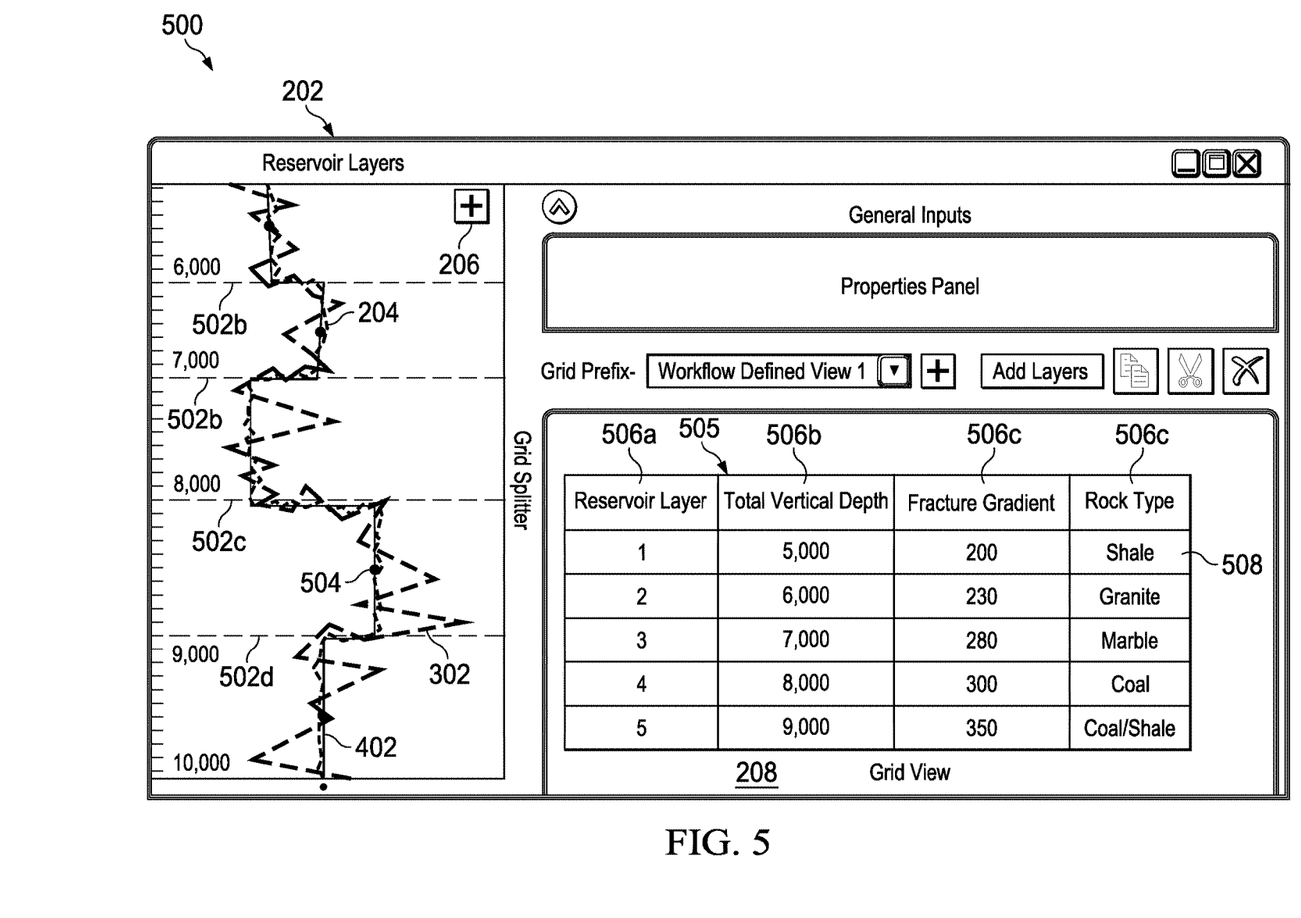
FIG. 5 is an example interface showing a plurality of identified layer boundaries.

FIG. 5 is an example interface 500 showing a plurality of layer boundaries 502*a-d* defined within the data pane 202. Each of the layer boundaries 502*a-d* represent a depth at which one layer ends and another layer begins. For example, the layer above layer boundaries 502*a* may be shale layer, while the layer below boundary 502*a* may be a granite layer. In some implementations, a user may identify the position of the layer boundaries 502*a-d* by interacting with the interface 500. For example, the user may click a pointing device (e.g., a mouse) within the data pane 202 to indicate a depth at which the layer boundary occurs. In some implementations, the user may click a button within the interface 500 to add a new layer boundary.

In some cases, the layer boundaries 502a-d may be defined automatically by the interface 500. For example, the interface 500 may examine the working line 402 to determine depths at which the working line 402 shifts indicating a layer boundary. The interface 500 may identify a layer boundary at these points. In some implementations, the interface 500 may allow the user to adjust the automatically identified layer boundaries.

When a layer boundary is defined, the user is presented with a paddle 504 on the working line 402. By dragging the paddle 504 left and right within the data pane 202, the user may change the properties of the defined layer. For example, assume the working line 402 represents fracture gradient measurements for the subterranean formation. By dragging the paddle 504 either left or right within the data pane 202, the user may adjust the fracture gradient associated with the layer in which the paddle 504 occurs. In some implementations, the interface 500 will display one paddle per layer within the data pane 202, allowing the user to set the property of the subterranean formation associated with the working line 402 for a particular layer by interacting with the paddle associated with that layer.

As shown, the grid pane 208 has been populated with a layer data table 505. The layer data table 505 includes a number of data rows 508. Each of the data rows 508 contains data associated with one of the layers defined within the data pane 202. For example, the first data row in the layer data table 505 represents the layer above layer boundary 502a, and the second data row in the layer data table 505 represents the layer between the layer boundary 502a and the layer boundary 502b.

The layer data table 505 includes a number of columns 506a-d defining the different types of data within the layer data table 505. In some implementations, the types of data displayed within the layer data table 505 may correspond to the types of data represented by the various data lines shown within the data pane 202. For example, the fracture gradient column 506c may include values corresponding with the value of the working line 402 for the various layers defined within the data pane 202. The layer data table 505 may also include data from other sources. For example, the rock type column 506d may be populated by querying external system with values from the data pane 202 associated with the particular layer to determine the type of rock in that layer.

In some implementations, the interface 500 may allow the user to export the layer data table 505 for use in other programs. For example, the interface 500 may allow the user to export the layer data table 505 into various formats, including, but not limited to, MICROSOFT EXCEL, ADOBE PDF, Hypertext Markup Language (HTML), plaintext, comma separated values (CSV), a database format such as, for example, MYSQL, and/or other formats. In some cases, the interface 500 may send the layer data table 505 to an external system, such as over a network. The interface 500 may also allow the data displayed within the data pane 202 to be exported.

Figure 6:
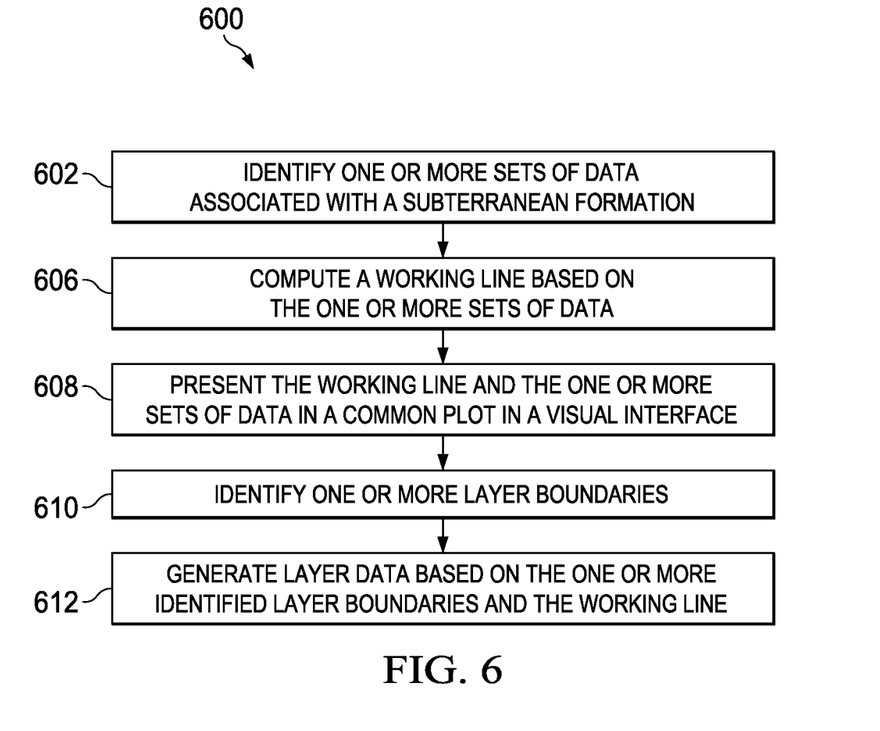
FIG. 6 is a flow chart illustrating an example method for identifying layers within a subterranean formation.

FIG. 6 is a flow chart illustrating an example method for identifying layers within a subterranean formation. At 602, one or more sets of data associated with the subterranean formation are identified. In some cases, identifying the sets of data includes allowing a user to import the data into a visual interface. Identifying one or more sets of data associated with the subterranean formation may include identifying at least one of: Log ASCII Standard (LAS) data, gamma ray logging data, sonic logging data, resistivity logging data, curve data, temperature data, pressure data, or porosity data.

At 604, the one or more sets of data are presented to a user in a visual interface. In some implementations, the sets of data are presented as described as shown and described relative to FIGS. 2-5. At 606, a working line is calculated based on the one or more sets of data. In some implementations, the working line represents a numerical average of the one or more sets of data. At 608, the working line is presented with the one or more sets of data in the visual interface.

At 610, one or more layer boundaries are identified. In some implementations, the one or more layer boundaries are identified by receiving indications from the user. The one or more layer boundaries may also be identified automatically, such as by computer system.

At 612, layer data is generated based on the one or more identified layer boundaries and the working line. In some implementations, an indication of a change in the position of a layer boundary may be received, and the layer data may be updated based on the change in position of the layer boundary. Generating the layer data may include generating one or more different types of data based on the working line, the one or more different types of data including density, total vertical depth, measured depth, fracture gradient, porosity, permeability, type of rock, or reflection distance. In some cases, the user may reposition the working line within the visual interface to change the layer data.

Notably, in certain instances, one or more of the above operations can be performed in a different order and/or omitted.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A client and server are generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). The relationship of client and server arises by virtue of computer programs running on the respective computers and having a client-server relationship to each other.

In some aspects, some or all of the features described here can be combined or implemented separately in one or more software programs for digitally characterizing and simulating wormhole structures. The software can be implemented as a computer program product, an installed application, a client-server application, an Internet application, or any other suitable type of software While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

The invention claimed is:
1. A computer-implemented method for facilitating user manipulation of subterranean formation data, the method comprising:
  identifying, with a downhole logging tool, a set of data associated with a subterranean formation having a plurality of layers;
  in response to identifying the set of data:
    displaying the set of data in a first pane of a visual interface as a graphical plot, the visual interface comprising a plurality of control elements adjustable by a user;
    computing, by operation of one or more processors, a working line based on the set of data, the working line representing a numerical average of the set of data; and
    displaying the working line in the first pane overlaid with the graphical plot;
  identifying one or more layer boundaries corresponding to one or more of the plurality of layers of the subterranean formation;
  in response to identifying the one or more layer boundaries:
    displaying the layer boundaries in the first pane together with the overlaid working line and graphical plot;
    generating layer data based on the one or more identified layer boundaries and the working line; and
    displaying the layer data in the visual interface;
  receiving an indication of a change in position within the first pane of at least one layer boundary of the one or more layer boundaries, the indication corresponding to user interaction with at least one of the plurality of adjustable control elements of the visual interface; and
  in response to receiving the indication:

automatically relocating the at least one boundary in the first pane relative to the working line and graphical plot based on the indication; and automatically generating and displaying updated layer data based on the indication.

2. The method of claim 1, wherein generating the layer data includes generating one or more different types of data based on the working line, the one or more different types of data including density, total vertical depth, measured depth, fracture gradient, porosity, permeability, type of rock, or reflection distance.

3. The method of claim 1, wherein identifying a set of data associated with the subterranean formation includes identifying at least one of: Log ASCII Standard (LAS) data, gamma ray logging data, sonic logging data, resistivity logging data, curve data, temperature data, pressure data, or porosity data.

4. The method of claim 1, wherein the identified set of data includes different types of data.

5. The method of claim 1, wherein identifying one or more layer boundaries includes receiving identifications of the one or more layer boundaries from the user.

6. The method of claim 1, further comprising:

receiving an indication of a change in position of the working line within the first pane of the visual interface, the indication corresponding to user interaction with at least one of the plurality of adjustable control elements, and in response to receiving the indication, automatically generating and displaying updated layer data based on the indication.

7. The method of claim 1, wherein identifying one or more layer boundaries includes automatically identifying the one or more layer boundaries based on the working line.

8. A non-transitory, computer-readable medium storing instructions operable when executed to cause at least one processor to perform operations comprising:

identifying, with a downhole logging tool, a set of data associated with a subterranean formation having a plurality of layers;

in response to identifying the set of data:

displaying the set of data in a first pane of a visual interface as a graphical plot, the visual interface comprising a plurality of control elements adjustable by a user;

computing, by operation of one or more processors, a working line based on the set of data, the working line representing a numerical average of the set of data; and displaying the working line in the first pane overlaid with the graphical plot;

identifying one or more layer boundaries corresponding to one or more of the plurality of layers of the subterranean formation;

in response to identifying the one or more layer boundaries:

displaying the layer boundaries in the first pane together with the overlaid working line and graphical plot;

generating layer data based on the one or more identified layer boundaries and the working line; and displaying the layer data, in the visual interface;

receiving an indication of a change in position within the first pane of at least one layer boundary of the one or more layer boundaries, the indication corresponding to user interaction with at least one of the plurality of adjustable control elements of the visual interface; and in response to receiving the indication:

automatically relocating the at least one boundary in the first pane relative to the working line and graphical plot based on the indication; and automatically generating and displaying updated layer data based on the indication.

9. The computer-readable medium of claim 8, wherein generating the layer data includes generating one or more different types of data based on the working line, the one or more different types of data including density, total vertical depth, measured depth, fracture gradient, porosity, permeability, type of rock, or reflection distance.

10. The computer-readable medium of claim 8, wherein identifying a set of data associated with the subterranean formation includes identifying at least one of: Log ASCII Standard (LAS) data, gamma ray logging data, sonic logging data, resistivity logging data, curve data, temperature data, pressure data, or porosity data.

11. The computer-readable medium of claim 8, wherein the identified set of data includes different types of data.

12. The computer-readable medium of claim 8, wherein identifying one or more layer boundaries includes receiving identifications of the one or more layer boundaries from the user.

13. The computer-readable medium of claim 8, further comprising:

receiving an indication of a change in position of the working line within the first pane of the visual interface, the indication corresponding to user interaction with at least one of the plurality of adjustable control elements, and in response to receiving the indication, automatically generating and displaying updated layer data based on the indication.

14. The computer-readable medium of claim 8, wherein identifying one or more layer boundaries includes automatically identifying the one or more layer boundaries based on the working line.

15. A system comprising:

memory for storing data; and one or more processors operable to perform operations comprising:

identifying, with a downhole logging tool, a set of data associated with a subterranean formation having a plurality of layers;

in response to identifying the set of data:

displaying the set of data in a first pane of a visual interface as a graphical plot, the visual interface comprising a plurality of control elements adjustable by a user;

computing, by operation of one or more processors, a working line based on the set of data, the working line representing a numerical average of the set of data; and displaying the working line in the first pane overlaid with the graphical plot;

identifying one or more layer boundaries corresponding to one or more of the plurality of layers of the subterranean formation;

in response to identifying the one or more layer boundaries:

displaying the layer boundaries in the first pane together with the overlaid working line and graphical plot;

generating layer data based on the one or more identified layer boundaries and the working line; and displaying the layer data in the visual interface;
receiving an indication of a change in position within the first pane of at least one layer boundary of the one or more layer boundaries, the indication corresponding to user interaction with at least one of the plurality of adjustable control elements of the visual interface; and
in response to receiving the indication:
automatically relocating the at least one boundary in the first pane relative to the working line and graphical plot based on the indication; and
automatically generating and displaying updated layer data based on the indication.

\* \* \* \* \*